United States Patent [19]
Hsu et al.

[11] Patent Number: 5,313,649
[45] Date of Patent: May 17, 1994

[54] SWITCH QUEUE STRUCTURE FOR ONE-NETWORK PARALLEL PROCESSOR SYSTEMS

[75] Inventors: Yarsun Hsu, Pleasantville; Rory D. Jackson, Eastchester, both of N.Y.

[73] Assignee: International Business Machines Corporation, Armonk, N.Y.

[21] Appl. No.: 706,136

[22] Filed: May 28, 1991

[51] Int. Cl.⁵ .............................................. G06F 15/16
[52] U.S. Cl. .................................. 395/800; 364/228.9; 364/229; 364/241.9; 364/242.94; 364/DIG. 1
[58] Field of Search ........................ 395/200, 250, 800

[56] References Cited

U.S. PATENT DOCUMENTS

| | | | |
|---|---|---|---|
| 4,757,529 | 7/1988 | Glapa et al. | 379/244 |
| 4,763,122 | 8/1988 | Franaszek | 340/825.79 |
| 4,856,100 | 8/1989 | Lehman | 342/51 |
| 4,914,653 | 4/1990 | Bishop et al. | 370/85.6 |
| 4,920,484 | 4/1990 | Ranade . | |
| 4,985,832 | 1/1991 | Grondolski | 395/800 |
| 5,107,489 | 4/1992 | Brown et al. | 370/58.2 |
| 5,144,293 | 9/1992 | Rouse | 340/825.02 |
| 5,165,021 | 11/1992 | Wu et al. | 395/250 |
| 5,235,689 | 8/1993 | Baker et al. | 395/425 |

FOREIGN PATENT DOCUMENTS 0347763 6/1989 European Pat. Off. .

Primary Examiner—David Y. Eng
Assistant Examiner—Ayni Mohamed

[57] ABSTRACT

A switch queue structure for one-network parallel processor systems minimizes chip count and reduces the possibility of deadlock which might otherwise occur with this type of switch structure. The switch queue structure comprises a plurality of input ports and a plurality of output ports equal in number to a number of processor/memory elements (PMEs) in a parallel processor system. A plurality of identical stages interconnect the plurality of input ports and the plurality of output ports. Each stage includes a plurality of first groups of first-in, first-out (FIFO) registers storing request messages, a plurality of second groups of first-in, first-out registers storing response messages, and a plurality of multiplexers. Each of the multiplexers have inputs connected to the FIFO registers in each of the first and second groups for routing responses to memory requests from addressed processor/memory elements to requesting processor/memory elements and for routing memory requests from processor/memory elements to addressed processor/memory elements.

4 Claims, 6 Drawing Sheets

SWITCH QUEUE STRUCTURE FOR ONE-NETWORK PARALLEL PROCESSOR SYSTEMS

BACKGROUND OF THE INVENTION

1. Field of the Invention

The present invention generally relates to a multinode interconnection network architecture for use with highly parallel computing systems and, more particularly, to a new switch queue structure which reduces the problem of "deadlock" when using only a single copy of a multi-stage interconnection network (MIN) in a highly parallel computer system.

2. Description of the Prior Art

High performance computer systems frequently involve the use of multiple central processing units (CPUs), each operating independently, but occasionally communicating with one another or with memory modules (MMs) when data needs to be exchanged. A switching system, such as a crossbar switch, is used to interconnect CPUs and MMs. U.S. Pat. No. 4,605,928 to C. J. Georgiou describes a crossbar switch composed of an array of smaller crossbar switches, each on a separate integrated circuit (IC). U.S. Pat. No. 4,360,045 to C. J. Georgiou describes a controller for the crossbar switch. This particular controller must sequentially service multiple ports requesting connection through the crossbar switch. U.S. Pat. No. 4,875,704 to C. J. Georgiou et al. describes a switching system which uses a one sided crosspoint switching matrix for establishing connections between pairs of port adapters in a communication system. The switching matrix controller can only connect currently available port adapters and cannot establish a waiting queue.

An example of the a parallel computer system of the type described is the IBM Research Parallel Processor Prototype (RP3) system described by G. F. Pfister, W. C. Brantley, D. A. George, S. L. Harvey, W. J. Kleinfelder, K. P. McAuliffe, E. A. Melton, V. A. Norton, and J. Weiss in "The IBM Research Parallel Processor Prototype (RP3): Introduction and Architecture", *Proc. International Conference on Parallel Processors*, Aug. 1985, pp. 764-771. The RP3 comprises a plurality of processor/memory elements (PMEs) interconnected in a network. Each PME contains a high performance 32-bit state-of-the-art microprocessor, 2M-4M bytes of memory, a 32K byte "intelligent" cache memory, floating-point support, and an interface to an input/output (I/O) and support processor. A memory reference is translated to a global address which is presented to the network interface. The global address includes a part which specifies the PME in which the referenced data lies. The memory reference is sent over the network to the addressed PME which responds. The response is returned through the network to the initiating PME where it is treated as if it had been generated by the local memory.

Figure 1:
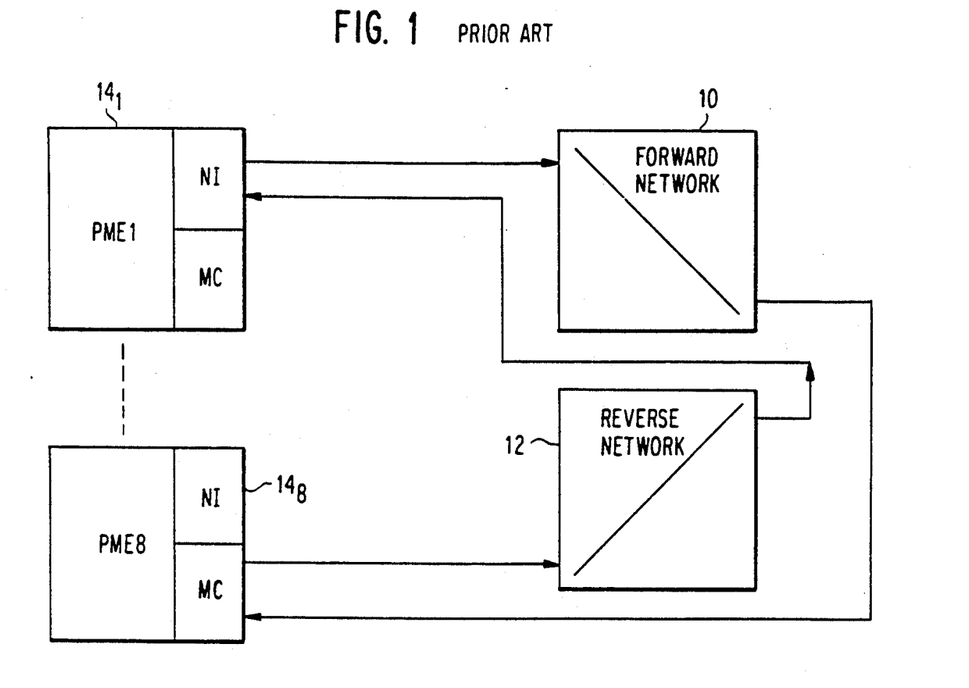
FIG. 1 is a generalized block diagram showing a known dual interconnection network for a parallel computer system.

In the current RP3 system, two networks 10 and 12 as shown in FIG. 1 are used for the communication between the PMEs $14_1$ to $14_8$. Each of the PMEs include a network interface (NI) and a memory controller (MC), as described by G. F. Pfister et al., supra. Network 10, referred to as the forward network, is used to direct the requests from initiating PMEs to addressed PMEs, and network 12, referred to as the reverse network, is used to return the responses from the addressed PMEs to the initiating PMEs.

For a large parallel processor system, one network consists of many chips, cards and cages. For example, in the original 512-way RP3 system, one network requires 2304. 2×2 switching chips, 144 cards (assuming sixteen chips per card), and eight cages (assuming twenty cards per cage). In addition, horrendous cablings are needed to connect all these chips, cards and cages. Eventually, the network itself can cost as much as or, in large parallel systems, even more than the PMEs. Furthermore, if power requirements are, say, one watt per chip, then one network consumes more than 2300 watts. Therefore, it is highly desirable to use only one network for both requests and responses.

Figure 2:
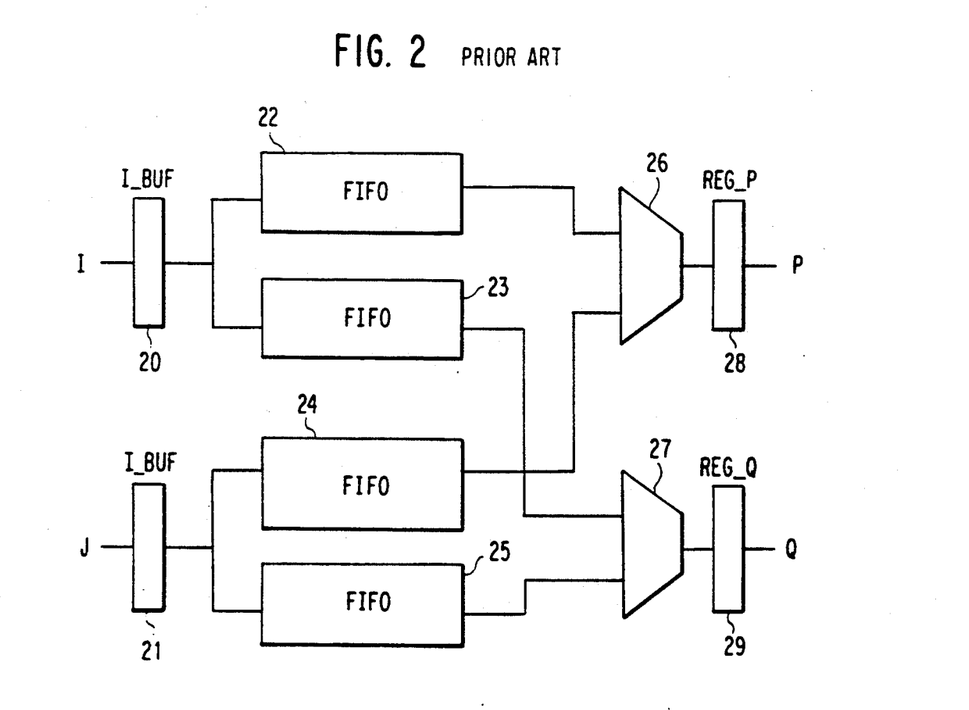
FIG. 2 is block diagram showing a queue structure used in the interconnection network shown in FIG. 1.

FIG. 2 shows a typical switch queue structure comprising an I-port connected to an input buffer (I_BUF) 20 and a J-port connected to an input buffer (J_BUF) 21. The input buffer 20 provides inputs to two first-in, first-out (FIFO) registers 22 and 23, and the input buffer 21 provides inputs to two FIFO registers 24 and 25. The outputs of FIFO registers 22 and 24 are connected to a first multiplexer (MUX) 26, and the outputs of FIFO registers 23 and 25 are connected to a second MUX 27. The outputs of the MUXes 26 and 27 are separately buffered by output buffers 28 and 29, respectively, here designated as REG_P and REG_Q.

Figure 3:
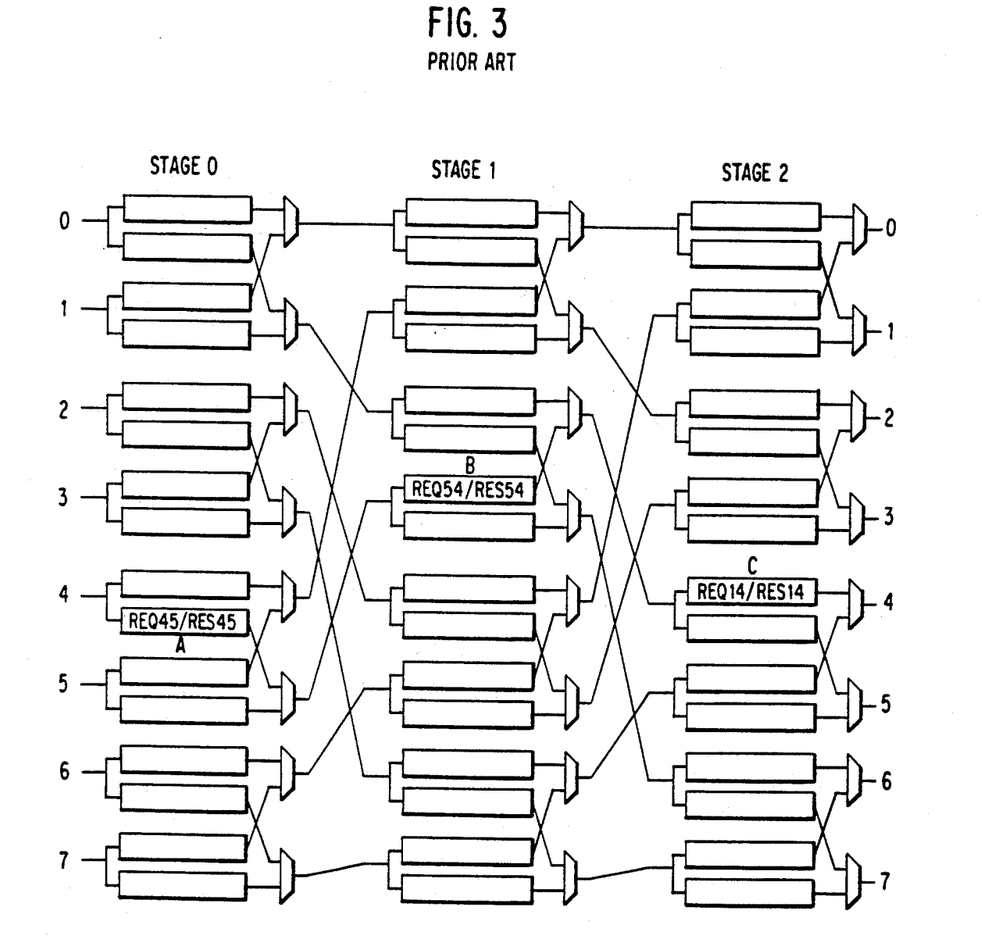
FIG. 3 is a block diagram of a three stage interconnection network based on the queue structure shown in FIG. 2 illustrating the problem of deadlock with this structure.

With the switch queue structure used in the current design, as shown in FIG. 2, there is the possibility of deadlock if both requests and responses are sent through the same network. FIG. 3 illustrates one deadlock scenario in a three stage network composed of the switch queue structure of FIG. 2. For the sake of simplicity in describing the problem, it is assumed that each queue can hold two messages, and the input/output (I/O) buffers (i.e., buffers 20, 21, 28, and 29) are omitted in the discussion. It can be shown that the deadlock scenario generalizes to networks with more than three stages and with larger than two message queues.

By design, processors can always accept responses from the network since they are the result of locally generated requests. A request reserves local space for the eventual response. The processor will not generate more outgoing requests than it has space for incoming responses, and it will accept incoming responses without regard for relative time order of arrival and independent of any condition of the network.

On the other hand, a processor's local memory function has limited buffer space in its pipeline for incoming request messages. This pipeline can at times become completely filled when it is unable to transmit the outgoing response messages it generates into the network.

With these assumptions in mind, it can be seen that FIG. 3 illustrates a deadlock example. Processor 4 receives responses and its memory receives requests from port 4 on the right side of the network. Processor 4 sends requests and its memory sends responses into port 4 on the left side of the network. In FIG. 3, the local memory of processor 4 has a response $RES_{45}$ (i.e., the response sent from $PME_4$ to $PME_5$) waiting to enter the network in input port 4. Input port 4 cannot accept the response because queue A in network stage 0 is occupied by a request $REQ_{45}$ (i.e., request from $PME_4$ to $PME_5$) and an earlier response $RES_{45}$. Request $REQ_{45}$ cannot advance because queue B in network stage 1 is occupied by a response $RES_{54}$ and a request $REQ_{54}$. Response $RES_{54}$ cannot advance because queue C in network stage 2 is occupied by requests $REQ_{14}$ and REQ04. Request REQ14 cannot be accepted by memory 4 because that memory's request pipeline space is occupied and cannot be cleared until response RES45 can be sent into the network. Once in this state, there is no way out.

As semiconductor technology is scaled down, the circuit density is being greatly increased. However, the number of I/Os has not increased proportionally. The end result of this trend is that there is sufficient silicon real estate to put in the logic functions but not enough I/Os to access them.

SUMMARY OF THE INVENTION

It is therefore an object of the present invention to provide a new queue structure that takes advantage of the increased circuit counts but does not add many extra I/Os.

It is another object of the invention to provide a new queue structure that enables the use of only one network for a parallel processor system and also avoids the possibility of deadlock.

According to the invention, there is provided a switch queue structure for one-network parallel processor systems of the type including a plurality of processor/memory elements (PMEs) interconnected with the switch queue structure. Each PME contains a processor, memory, and an interface to the switch queue structure. A memory reference from a requesting PME is transmitted to a specified PME in which referenced data lies and a response is returned to the requesting PME where it is treated as if it had been generated by local memory. The switch queue structure comprises a plurality of input ports and a plurality of output ports equal in number to a number of PMEs in a parallel processor system. A plurality of identical stages interconnect the input ports and the output ports.

In an illustrative embodiment, the stages are composed of 2×2 switches, and the number of stages is three. Each stage includes a plurality of first groups of four first-in, first-out (FIFO) registers storing response messages, a plurality of second groups of four first-in, first-out registers storing request messages, and a plurality of pairs of multiplexers, each having four inputs. Each of the multiplexers have two inputs connected to registers in the first or request group of FIFO registers and two inputs connected to registers in the second or response group of FIFO registers. Inputs from the response group have higher priority than those from the request group thereby reducing the possibility of deadlock. Within the same group, a round robin priority is preferably adopted to provide equal opportunity to be served.

Although a 2×2 switching node is used in the illustrative embodiment, the structures disclosed can be extended to any k×k switches with k>2.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 4:
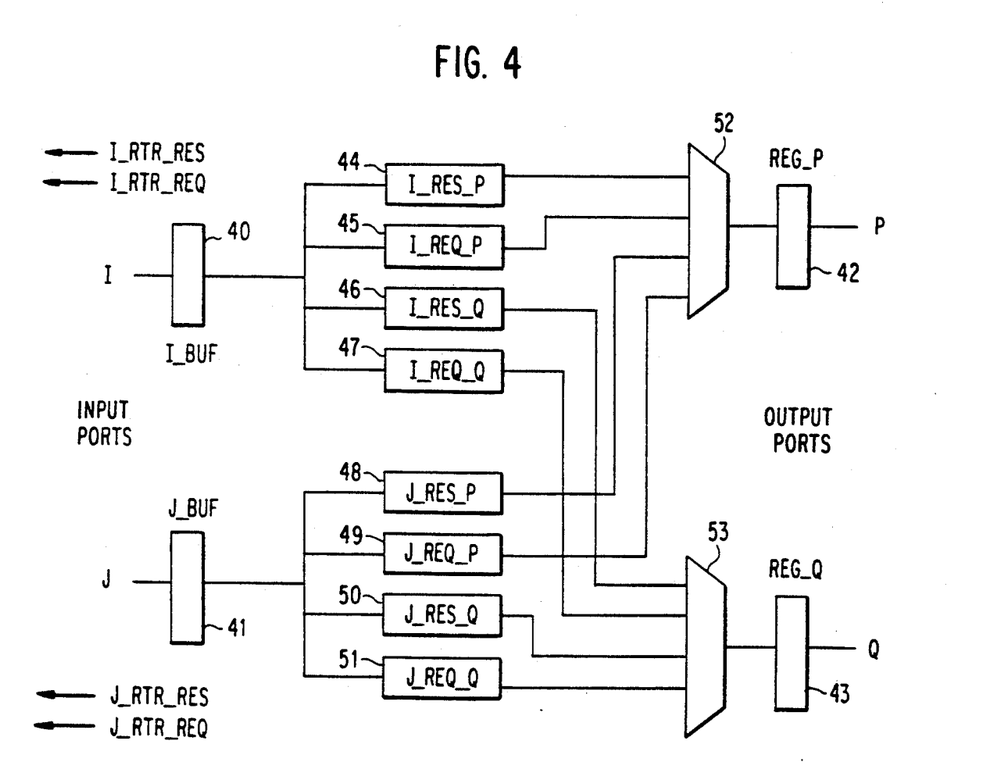
FIG. 4 is a block diagram of a new switch structure according to the invention for a single interconnection network.

Referring to FIG. 4 of the drawings, there is shown a new queue structure according to a preferred embodiment of the invention. This queue structure is especially designed for a single network parallel processor system. Although 2×2 switches are used in the illustrative example, the structure can be extended to any k×k switch with k>2, where k is an integer.

As seen in FIG. 4, there are input buffers 40 and 41 (I_BUF, J_BUF) and output buffers 42 and 43 (REG_P, REG_Q), as in FIG. 2. However, instead of two FIFO registers per input buffer, there are four. Specifically, there are FIFO registers 44, 45, 46, and 47 (I_RES_P, I_RES_Q, I_REQ_P, I_REQ_Q) associated with input buffer 40 and FIFO registers 48, 49, 50, and 51 (J_RES_P, J_RES_Q, J_REQ_P, J_REQ_Q) associated with input buffer 41. FIFO registers 44, 45, 48, and 49 are connected by MUX 52 to output buffer 42, while FIFO registers 46, 47, 50, and 51 are connected by MUX 53 to output buffer 43.

These FIFO registers 44 to 51 can be classified into two groups. I_RES_P, I_RES_Q, J_RES_P, J_RES_Q belong to the first or response group and are used to store returned response messages. I_REQ_P, I_REQ_Q, J_REQ_P, J_REQ_Q belong to the second or request group and are used to store request messages. In addition, each group of FIFO registers is assigned a priority which can be programmed by the user through LSSD (level sensitive scan design) logic chains before running messages through the network.

I_RTR_RES, I_RTR_REQ, J_RTR_RES, J_RTR_REQ shown on the left hand side of FIG. 4 represent ready-to-receive (RTR) protocols sent to the previous stage to signal that the corresponding FIFO registers have enough spaces to receive more messages. The assertion of I_RTR_RES is determined by the available spaces of I_RES_P and I_RES_Q FIFO registers. Similarly, I_RTR_REQ is determined by I_REQ_P and I_REQ_Q FIFO registers, J_RTR_RES by J_RES_P and J_RES_Q FIFO registers, and J_RTR_REQ by J_REQ_P and J_REQ_Q FIFO registers.

The function of the structure shown in FIG. 4 is as follows. I and J are the input ports, P and Q are the output ports. A message can come in either to the I port or to the J port and can be routed to either of the output ports P or Q. Each message carries several routing bits (the number of routing bits depends on the size of the network) and one F-R (forward-reverse) bit in its header. When the header is latched into one of the input buffers (I_BUF or J_BUF), the routing bit corresponding to this stage is checked to see if the message should be routed to the P or to the Q output port. In addition, the F-R bit is also checked to see if it is a forward request or a returned response. The message is then routed to one of the four FIFO registers associated with the input port depending on the routing bit and the F-R bit as explained above.

Figure 5:
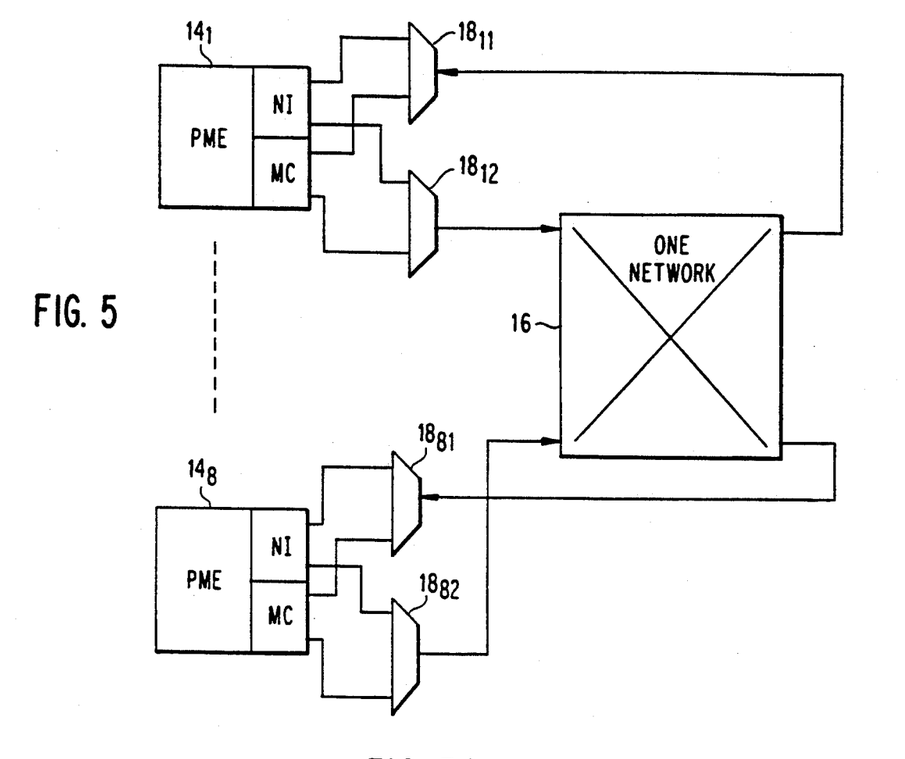
FIG. 5 is a generalized block diagram, similar to FIG. 1, showing a single interconnection network for a parallel computing system.

As stated before, priority can be assigned to each group of FIFO registers. In the case that one network is used for both forward requests and returned responses, higher priority can be assigned to the response group of FIFO registers and lower priority to the request group of FIFO registers. In this way, the returned responses are always served before the forward requests. Even if the request group of FIFO registers are filled up with messages, the returned responses can still reach the processors without being blocked since they occupy separate FIFO registers and have higher priority. This eliminates the possibility of deadlock. The single interconnection network system is shown in FIG. 5 and comprises a single network switch 16 communicating with PMEs $14_1$ to $14_8$ via multiplexers $18_{11}$, $18_{12}$ to $18_{81}$, $18_{82}$. This single interconnection network system employs the new queue structure according to the invention as shown in FIG. 4.

In order to further avoid the possibility of deadlock, it is important to be careful about the interface protocol between stages of the network. Since two groups of FIFO registers are used with different priority assigned, at least two protocol signals associated with each input port are needed, one for each group of FIFO registers. In this way, the status of one group of FIFO registers as being full will not prevent the messages belonging to the other group from being clocked into the switch. This is why there are I_RTR_RES and I_RTR_REQ protocols for the I input port and J_RTR_RES and J_RTR_REQ for the J input port. If the request group of FIFO registers (I_REQ_P and/or I_REQ_Q) are full, then I_RTR_REQ is inactive. However, since the response group of FIFO registers (I_RES_P and I_RES_Q) uses a separate ready-to-receive protocol (i.e., I_RTR_RES), the response message can still be received. This guarantees that the deadlock illustrated in FIG. 3 cannot occur. Although, it is possible to use more complicated protocols to control each individual FIFO register instead of groups of registers for better utilization of queues, the idea is the same. In addition, the output register will start to send a message to the next stage only when it receives an assertive ready-to-receive (RTR) signal from the following stage and it has messages waiting in the corresponding FIFO registers.

When the receiver signals to the transmitter that it has enough space to take another message by asserting the protocol, it is required to take the whole message once the first packet is taken. This guarantees that a message will not spread across more than two stages. It prevents a stuck in transit request message from blocking the passage of a response message and vice versa. Furthermore, if input and output buffers are used as in FIG. 4, they are only used during message flow. They should not be part of the queue. For example, if a request packet gets stuck in an input buffer, it can prevent the response packets from getting into that switching node completely.

The output MUXes 52 and 53 in FIG. 4 work as follows. There are four inputs to each MUX, two from the response group and two from the request group. Inputs from the response group have higher priority than those from the request group. Within the same group, a round robin priority is adopted to provide equal opportunity to be served. The priority associated with each group of FIFO registers can be programmed by the user, and therefore it is possible to assign equal priority to all FIFO registers so that the chip can be used in a two network configuration. In addition, it is also possible to assign the higher priority to the request group of FIFO registers if there is a need to do so.

Figure 6:
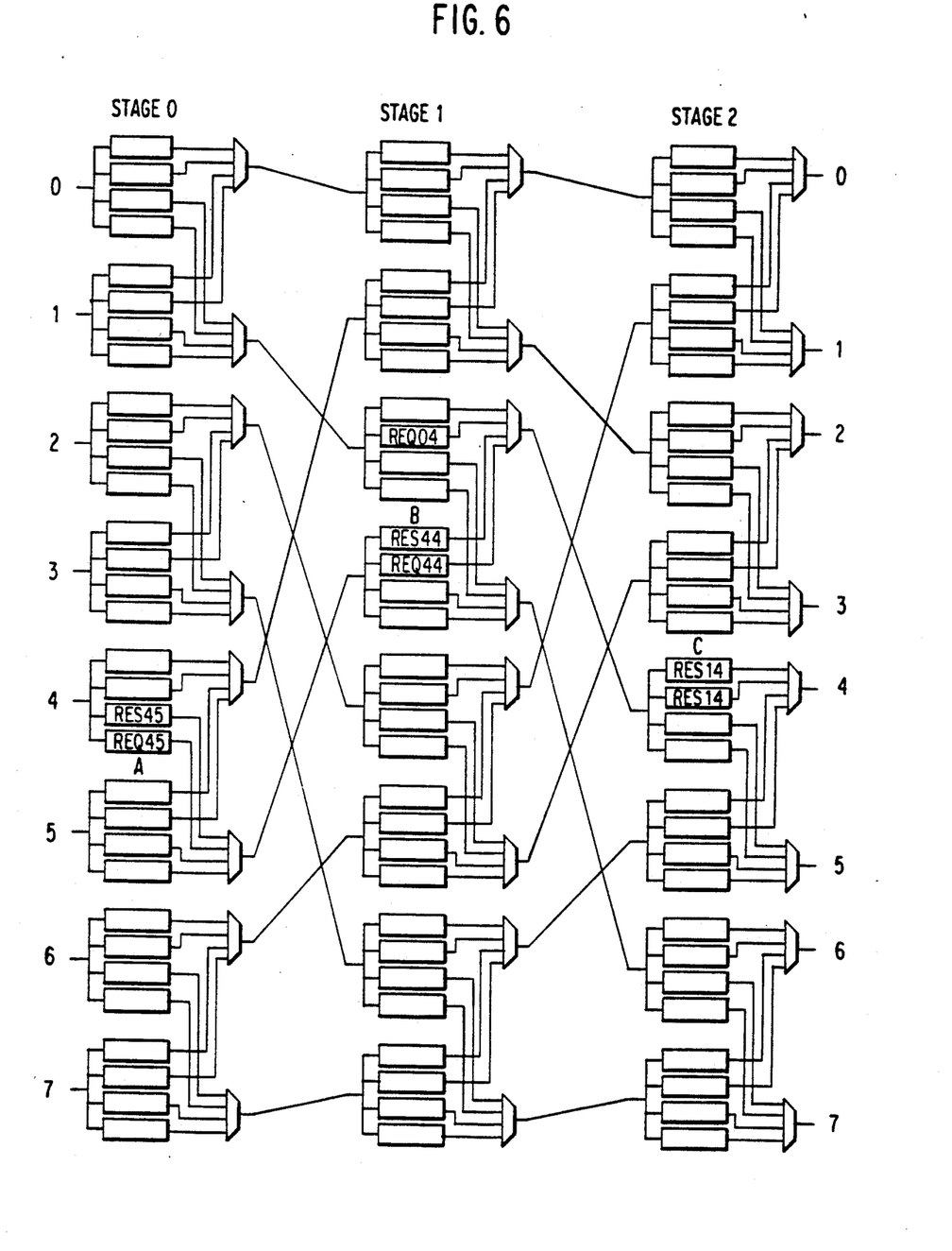
FIG. 6 is a block diagram of a three stage interconnection network based on the queue structure shown in FIG. 4.

The three stage interconnection network of FIG. 6 incorporates the new queue structure shown in FIG. 4 according to the invention. Queues in the network in FIG. 6 are limited to one message space so the comparison to FIG. 3 is fair. The difference is that queues A-RES, B-RES and C-RES can only contain response messages, while queues A-REQ, B-REQ and C-REQ can only contain request messages. The same set of messages used in FIG. 3 are allocated to the queues in FIG. 6 with the addition of response ($RES_{04}$). As previously stated, processor 4 can always accept responses from the network via output port 4. This allows response $RES_{04}$ to leave the network freeing queue C-RES. In the next cycle, response $RES_{54}$ can advance to queue C-RES, freeing queue B-RES. This process continues until queue A-RES is free allowing the response at memory 4 to enter the network. At that point, the request $REQ_{14}$ can leave the network, and so on.

With the new separate queue structure, request and response messages are always independently accessible at every stage and at the network input and output ports. This alleviates any possibility of interference between request and response messages that might cause blocking. Response messages can always be drained from the network by PMEs. This guarantees that request pipelines at the memories can eventually be emptied which in turn permits the request network to progress.

The advantages of the new queue structure according to the invention over the prior art can be summarized as follows:

1. Deadlock is reduced by assigning high priority to the FIFO registers used to store returned responses and by using separate protocols for each group of FIFO registers.

2. The structure enables the use of a single network for a parallel computer system. The saving is one hardware network which consists of $(N/K)\log_K(N)$ chips and all the cablings, cards and cages associated with that network. N is the size of the network and K is the size of the switching node. For example, if N=512 and K=2, the savings are 2304 chips, 144 cards (assuming sixteen chips per card), 2304 watts (assuming one watt per chip), eight cages (assuming twenty cards per cage), and all the associated cablings.

Figure 7A:
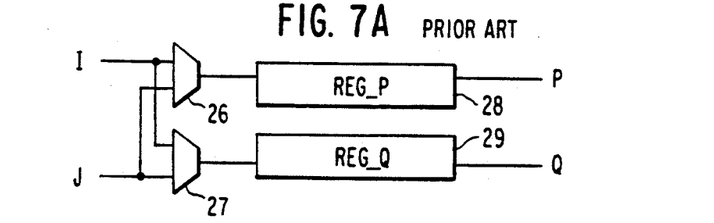
FIGS. 7A and 7B are, respectively, block diagrams of a conventional output queue structure and a modified output queue structure.
Figure 7B:
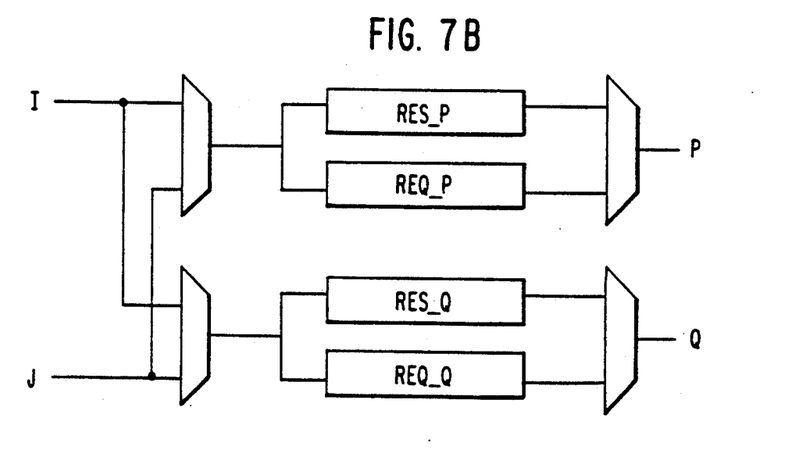

While the invention has been described in terms of a single preferred embodiment, those skilled in the art will recognize that the invention can be practiced with modification within the spirit and scope of the appended claims. For example, FIG. 7A illustrates a conventional output queue structure, and FIG. 7B illustrates the modified output queue structure according to the invention. For simplicity, the input and output registers are not shown. In FIG. 7B, RES_P and RES_Q_FIFO registers are used to store returned messages, and REQ_P and REQ_Q FIFO registers are used for storing request messages. Both the routing and F-R bits are checked at the inputs to the queues.

Figure 8:
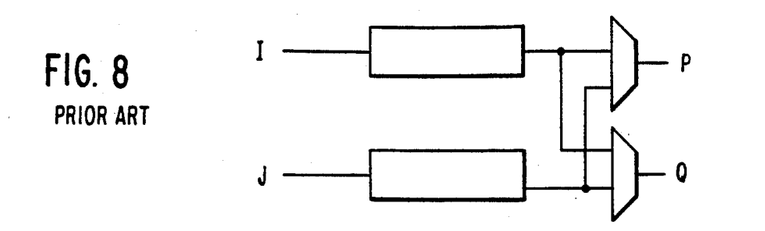
FIGS. 8A and 8B are, respectively, block diagrams of a conventional input queue structure and a modified input queue structure.
Figure 8B:
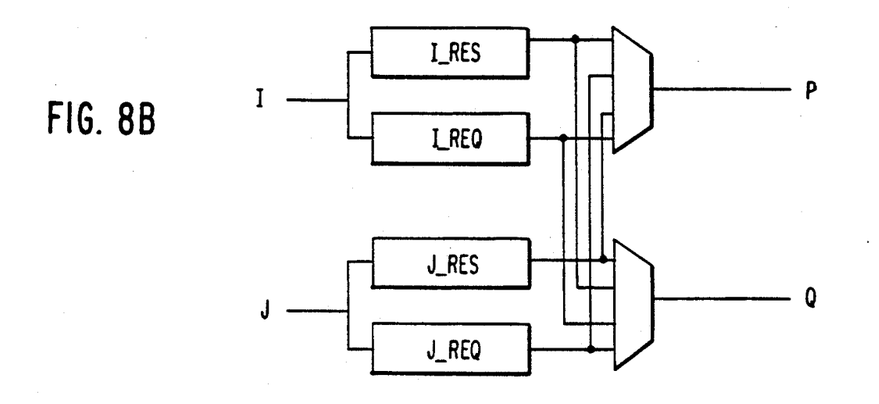
Figure 9A:
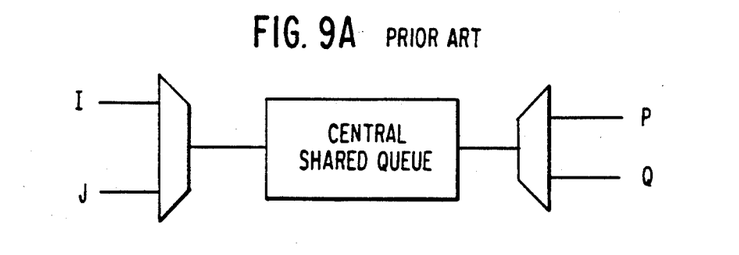
FIGS. 9A and 9B are, respectively, block diagrams of a conventional shared queue structure and a modified queue structure.
Figure 9B:
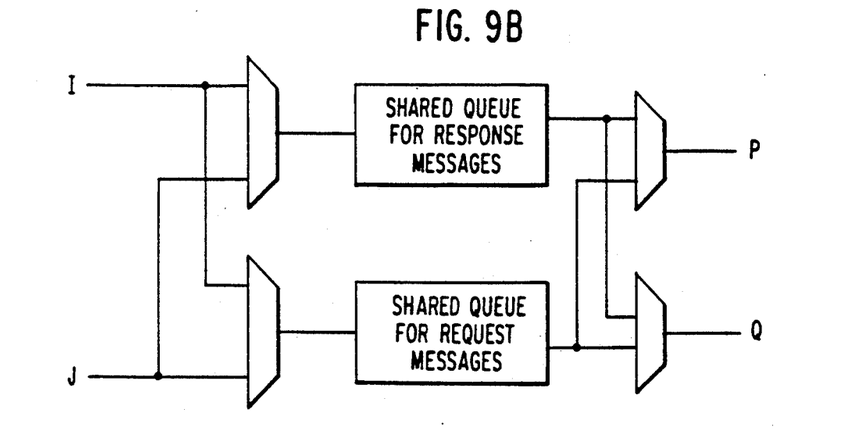

In another example, FIG. 8A illustrates a conventional input queue structure, and FIG. 8B illustrates the modified input queue structure according to the invention. In FIG. 8B, I_RES and J_RES FIFO registers are used for storing response messages, and I_REQ and J_REQ FIFO registers are for storing request messages. In addition, the F-R bit is checked at the input, and the routing bit is checked when exiting the FIFO registers. Furthermore, the concept can be extended to a shared queue as shown in FIGS. 9A and 9B.

Again, although a 2×2 switching node is used in these examples, the structures can be extended to any k×k switches with k>2.

Having thus described our invention, what we claim as new and desire to secure by Letters Patent is as follows:

1. The tightly coupled parallel processor system recited in claim 1 wherein said plurality of identical stages are composed of a plurality of 2×2 switches, each of said switches including four of said first-in, first-out registers of said first group and four of said first-in, first-out registers of said second group and two of said multiplexers, each of said multiplexers having two inputs connected to two of said first-in, first-out registers of said first group and two of said first-in, first-out registers of said second group.

2. The tightly coupled parallel processor system recited in claim 1 wherein inputs from said first group of first-in, first-out registers have a higher priority than inputs from said second group of first-in, first-out registers thereby reducing the possibility of deadlock.

3. The tightly coupled parallel processor system recited in claim 2 wherein priority within said first and second groups of first-in, first-out registers is assigned on a round-robin basis.

4. The tightly coupled parallel processor system recited in claim 3 wherein each switch further includes:
two input buffers connected to buffer messages to two first-in, first-out registers of each of said first and second groups of first-in, first-out registers; and
two output buffers connected to outputs of said two multiplexers to buffer messages from selected ones of said fist-in, first-out registers in each of said first and second groups of first-in, first-out registers.

* * * * *